May 22, 1962

W. D. BEHLEN 3,035,718

MEANS FOR UNLOADING STORED MATERIAL

Filed June 22, 1960

INVENTOR
WALTER D. BEHLEN
Talbert Dick & Farley
ATTORNEYS

INVENTOR
WALTER D. BEHLEN
Talbert Dick & Jarley
ATTORNEYS

May 22, 1962 W. D. BEHLEN 3,035,718
MEANS FOR UNLOADING STORED MATERIAL
Filed June 22, 1960 4 Sheets-Sheet 4

INVENTOR
WALTER D. BEHLEN
Talbert Dick & Darley
ATTORNEYS

United States Patent Office 3,035,718
Patented May 22, 1962

3,035,718
MEANS FOR UNLOADING STORED MATERIAL
Walter D. Behlen, Columbus, Nebr.
Filed June 22, 1960, Ser. No. 37,957
7 Claims. (Cl. 214—17)

This invention relates to a method of and means for unloading stored materials and more particularly to a mechanism that will remove stored farm crops from substantially the entire bottom horizontal area of a silo or like.

Usually silos are of vertical elongated tubular structure and after they have been filled with the farm crop, they are sealed. The periodical removal of the silage or like is through a small door adjacent the inside bottom of the silo. The removal of the material through the door opening is generally facilitated by a conveyor means extending to the bottom radial center of the silo. Obviously such unloading means, and its position, leave much to be desired. The uneven removal of material from the bottom area of the silo results in highly objectionable stresses and strains on the lower portion of the silo. Further, the "spot" removal of the material is most ineffective if the material is caked or entwined. Such a problem is also encountered when the green farm crop is frozen. A still further shortcoming of such equipment is that it does not successfully remove all the material from the silo.

Therefore, the principal object of my invention is to provide a silo or like unloading means that will successfully engage and remove substantially all the material residing in the bottom horizontal area of the silo or like.

A further object of this invention is to provide a silo unloading device that is capable of eating its own way through the silo exit door to an effective position within the bottom area of the silo.

A still further object of this invention is to provide a silo unloading apparatus that eliminates serious stresses and strains on the silo during the unloading operation.

A still further object of this invention is to provide a silo unloading means that does not damage the inside of the wall of the silo.

Still further objects of my invention are to provide a silo unloading means that is economical in manufacture and durable in use.

These and other objects will be apparent to those skilled in the art.

My invention consists in the construction, arrangements, and combination, of the various parts of the device, whereby the objects contemplated are attained as hereinafter more fully set forth, specifically pointed out in my claims, and illustrated in the accompanying drawings, in which:

FIG. 8 is a fragmentary enlarged top plan view, partly in section, of the forward end portion of the device as taken from the line 8—8 of FIG. 1.

Figure 2:
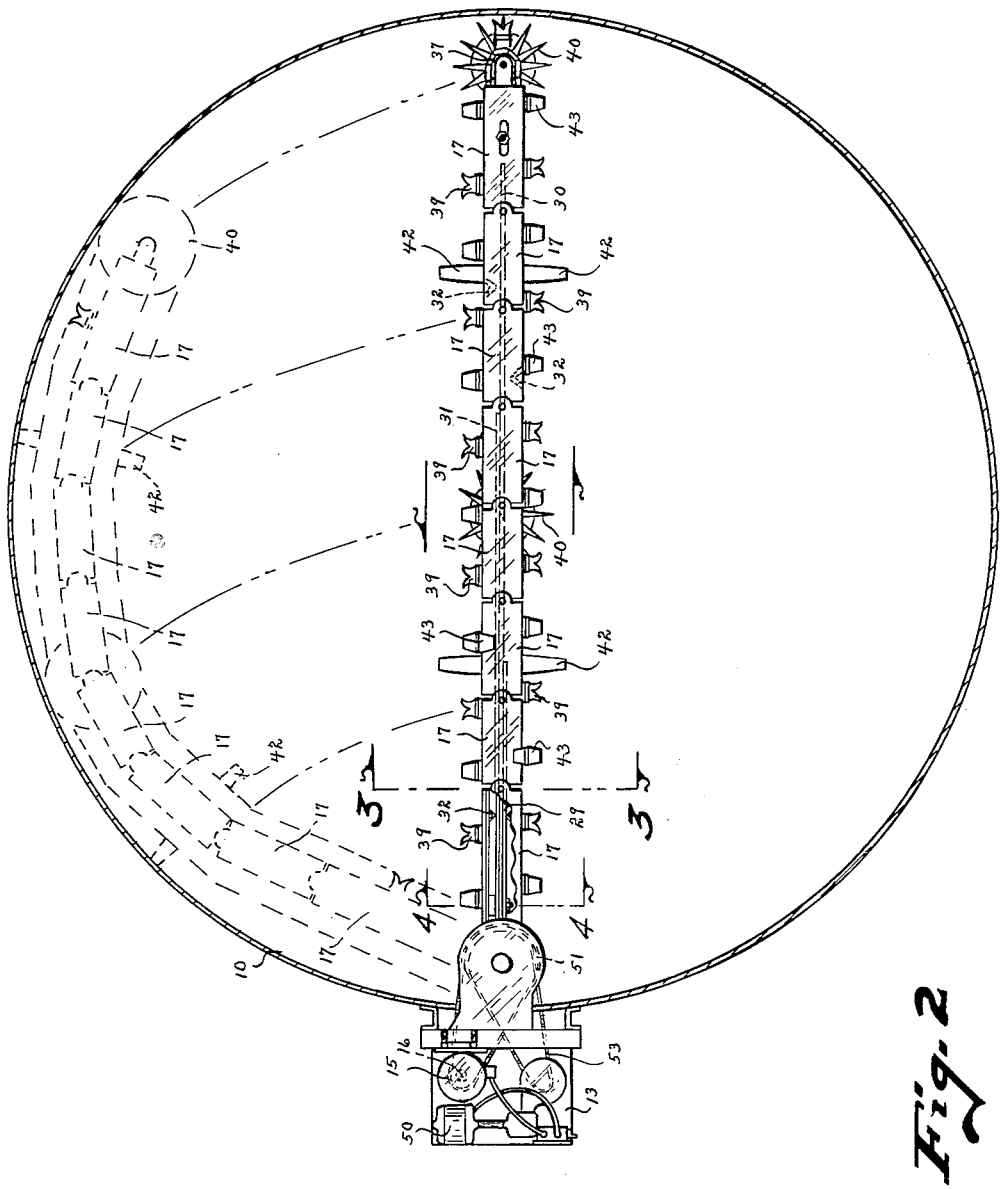
FIG. 2 is a top plan view of my device after it has reached its maximum distance within a silo and with broken lines illustrating its ability to curve within the bottom area of the silo.
Figure 3:
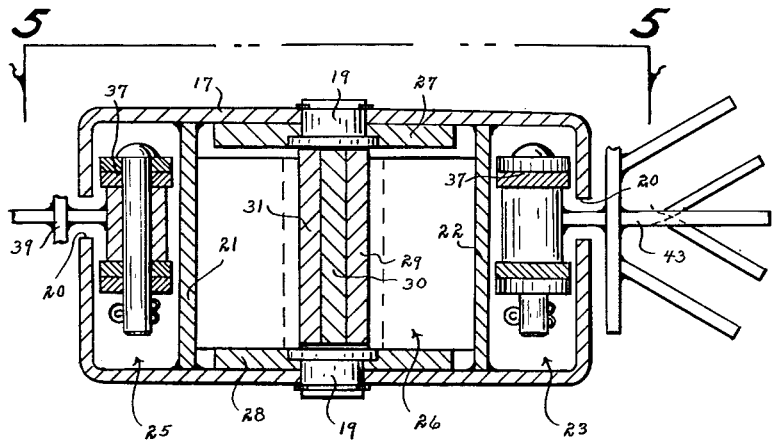
FIG. 3 is an enlarged cross-sectional view of the device taken on line 3—3 of FIG. 2.
Figure 6:
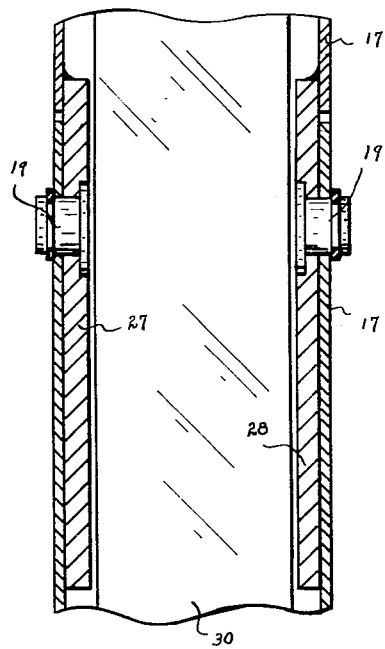
FIG. 6 is an enlarged vertical sectional view of two of the pivoted portions or sections taken on line 6—6 of FIG. 5.
Figure 5:
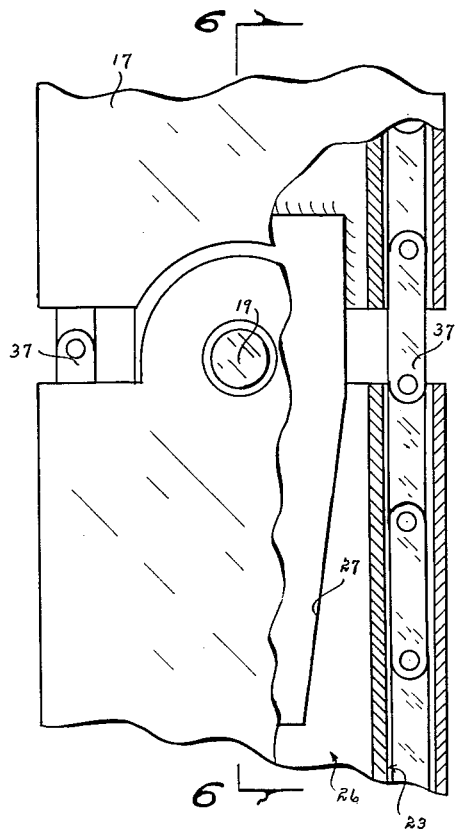
FIG. 5 is an enlarged top plan view in section of two of the joint portions that make up the elongated material removing device and is taken from line 5—5 of FIG. 3.
Figure 4:
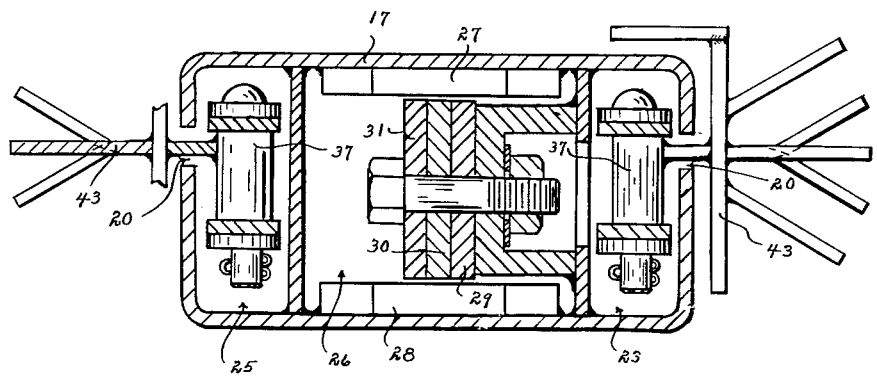
FIG. 4 is an enlarged cross-sectional view of my silo unloading device taken on line 4—4 of FIG. 2.
Figure 7:
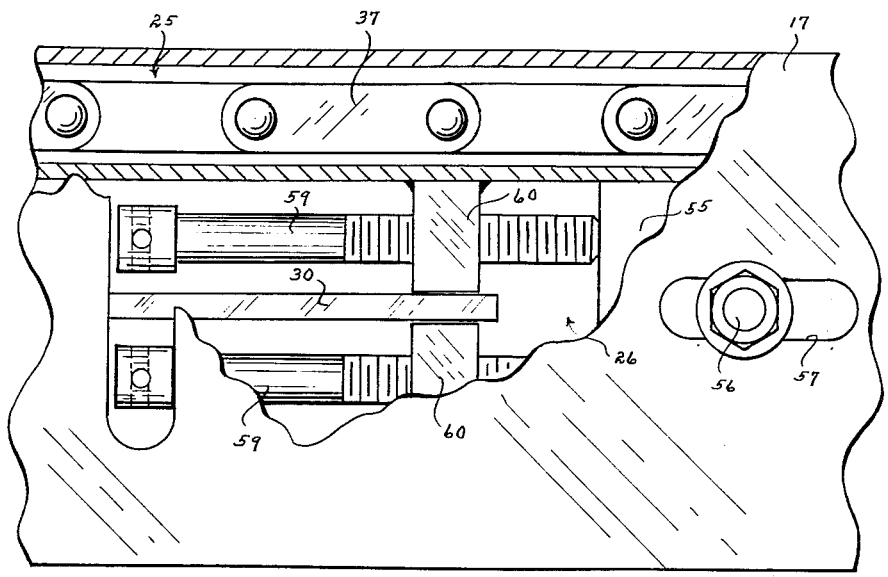
FIG. 7 is an enlarged top plan view of the forward end portion of the device as taken from line 7—7 of FIG. 1 and more fully illustrates its construction.

In the drawings I have used the numeral 10 to generally designate a silo adapted to contain crop material 11. Such silos have a door opening 12 near the ground level for the periodical removal of the material that has been stored in the silo. I have herebefore indicated the purpose of my device is to extend through the silo door opening and into the lower horizontal area of the silo for engaging and withdrawing the material from the silo out through the door opening. I have used the numeral 13 to designate the rear frame or base of my apparatus and which is adapted to support a prime mover 15 such as an electric motor having a drive shaft 16. The elongated portion of my device that is adapted to extend into the silo is chiefly made up of a plurality of frame sections or rectangular portions 17. These portions 17 are horizontally pivotally or hingedly secured together at their adjacent respective ends by any suitable means such as the headed rivet means 19 as shown in FIG. 6. When these various sections 17 are so hinged together they provide an elongated horizontally flexible unit member as shown in FIG. 2. Each portion or section 17 is rectangular in cross-section and has an elongated horizontal slot opening 20 in each side as shown in FIG. 3. Within each section 17 and spaced apart from each of the slot openings is a vertical wall. These two vertical walls 21 and 22 provide three chambers in each section 17, i.e., a right-hand endless chain passageway compartment 23, a left-hand endless chain passageway compartment 25, and a central compartment 26 as shown in FIG. 3. Secured in each upper and lower area of the compartment 26 of each sectional portion 17 is a rearwardly extending stop bar. I have designated these two stop bars by the numerals 27 and 28. They are both rigidly secured to their respective section 17 and extend rearwardly into the adjacent rear section 17 as shown in FIG. 5. These stop bars 27 and 28 are rearwardly tapered and permit a limited horizontal flexing of the elongated member that is made up of the sections 17. These sections 17 that make up the elongated unit are also yieldingly held against horizontal flexing. I accomplish this by rigidly securing three elongated leaf springs 29, 30 and 31 as shown in FIG. 2 to the rear-most sectional portion 17. These leaf spring means extend longitudinally through the central area of the compartment 26 of the sections 17 and only yieldingly tend to hold the sections 17 in a straight line. At each side of these leaf spring means and in each of the sections 17 are V-shaped spacer members 32. In order to provide suitable length resilient flexibility of the leaf spring members the center leaf spring 30 is much longer than that of the lengths of the leaf spring members 29 and 31. Also the leaf spring 29 is much shorter than the leaf spring 31. By this arrangement of parts the elongated unit made up of the sections 17 has limited uniform horizontal flexibility but the horizontal flexibility of any two sections 17 relative to each other will be limited and thus when the elongated unit member is completely horizontally flexed it will assume a circular outwardly bowed path such as shown by broken lines in FIG. 2. This horizontal flexibility of the elongated unit member will, however, be against the yieldable force of the leaf springs 29, 30 and 31. The numeral 33 designates a rotatably mounted sprocket gear wheel on the forward end of the forward section portion 17. The numeral 35 designates a sprocket gear wheel rotatably mounted on the rear end of the rear section 17. This rearmost section 17 has its rear end portion pivotally secured to the frame 13 and the shaft 36 of the sprocket gear wheel 35 is operatively secured by any suitable means to the prime mover 15. The numeral 37 designates an endless chain embracing the two sprocket gear wheels 33 and 35. This chain has its right length traveling in the compartment 23 of the various sections 17 and its left length traveling in the compartment 25 of the various sections 17. The numeral 39 designates a plurality of material engaging prongs or knife fingers secured to the various lengths of the endless chain and which radially extend from the chain and through the side slot openings 20 and 21 of the sections 17. These material engaging members 39 may be of any suitable shape or design but I recommend that at least some of them extend downwardly at an angle to the horizontal, that some of them extend upwardly at an angle to the horizontal and that some of them extend horizontally from the elongated unit member as shown in FIG. 4. By this construction and arrangement of parts when the shaft 36 of the sprocket gear wheel 35 is being rotated by the prime mover, the endless chain 37 will also be rotated and the material engaging members 39 will move forwardly at one side of the elongated unit member, around the forward end of the elongated unit member and then back at the other side of the elongated unit member. This movement of the chain and the material engaging members will be continuous for as long as the prime mover is rotating the chain and its material engaging members that are moving rearwardly toward the silo door opening will carry with them engaged material in the silo and move such material rearwardly through the silo door opening.

When the elongated unit is flexibly curved within the lower area of a silo, it is highly desirable and necessary that the material engaging members do not contact and damage the inside wall of the silo. Therefore, at the forward end of the forward section 17 I have rotatably mounted a pin wheel 40 which limits the material engaging members from contacting the inside wall of the silo. A like pin wheel 41 may be mounted near the center length of the elongated unit member. These pin wheels are positioned at the bottom of the elongated unit member and also a plurality of transversely arranged bars 42 may be placed on the under side of the elongated unit member for preventing the material contacting members from engaging the inside wall of the silo when the elongated member is flexed. Besides the material engaging members 39, a plurality of cutting bars 43 may be secured to the endless chain. These cutting bar knives may extend outwardly at different angles to the horizontal and some should even extend over the elongated unit member for cutting and removing material that may be pressing downwardly on the elongated unit member.

Figure 1:
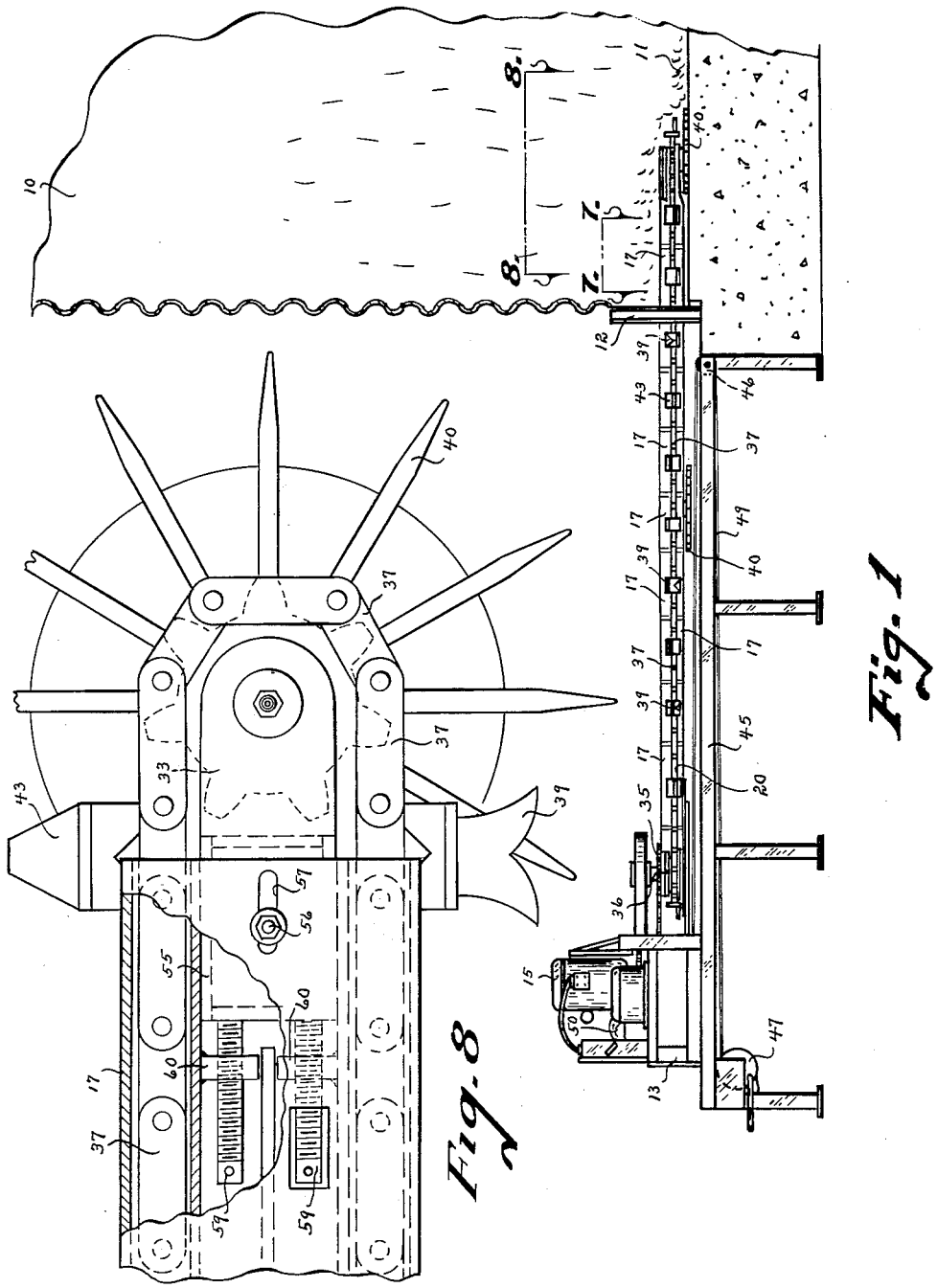
FIG. 1 is a side view of my device initially eating its way into the lower area of a silo.

When initially extending my apparatus into a silo as shown in FIG. 1, a frame track means 45 is used to support the entire device. For progressively moving the elongated unit member into the silo, I have a pulley wheel 46 at the forward end of the frame, a crank operated drum 47 on the rear end of the frame 45 and a cable 49 having one end secured to the rear end of the device extending over the pulley wheel 46 and thence to the drum 47. After the elongated unit member has reached its maximum penetration within the silo, the frame 45 will support the rear end portion of the device.

The desired flexing of the elongated unit member within the silo for the removal of all of the silage or like within in the bottom area of the silo may be accomplished in several ways. When a reversible prime mover is used or a gear box, it is possible to reverse the rotation of the endless chain 37. The pull of the chain at one side or the other side of the unit and/or the drag on the material engaging members will tend to flex the elongated unit member either to the left or right depending on the direction of rotation of the endless chain. One preferred method is to horizontally hingedly mount the rear end of the rear-most section 17 and employ a prime mover 50 for swinging the rear section 17 to the left or to the right. This may be accomplished by using a fluid pump and one or more hydraulic cylinders with the piston or pistons operatively connected to the rear-most section 17 for swinging it either to the left or to the right. Still another means would be to affix a sprocket wheel 51 to the rearmost section 17 and operatively connect the same to the prime mover 50 by a chain 53. For the reversal of the direction of rotation of the chain 53 the prime mover 50 may be a reversible electric motor or gear reversing mechanism which may be employed between this prime mover and the endless chain 53. Regardless of the method used, however, the idea is to cause by any suitable means the curved flexing of the elongated unit member to the left or right within the lower area of the silo thus successfully removing in a progressive manner substantially all of the material residing in the lower area of the silo. The elongated curvature of the elongated unit member is accomplished by two constructions, i.e., the resiliency of the centrally located leaf springs and by the stop bars 27 and 28 which limit the horizontal pivoting movement of any two sections 17.

Any suitable means may be used for pivotally hinging the sections 17 together. In FIG. 5 and FIG. 6 I have the forward end of each section 17 hingedly secured to the limiting stop bars 27 and 28 of the adjacent forward section 17.

Regardless of the specific structure of my device, the purpose, of course, is to provide an elongated unit member made up of a plurality of hinged sections, with these sections yieldingly held in a straight line and with each two adjacent sections limited in their horizontal swinging movement relative to the other. With the device in operation, the rearwardly moving side of the endless chain carrying the material engaging members will engage, break up and move material toward and out of the exit door of the silo. Any suitable means may be used for adjusting the tightness of the endless chain. In the drawings I show the forward sprocket gear rotatably mounted on a slidable base 55 in the forward-most section 17. This base 55 is rigidly secured in the desired adjustable position by bolt means 56 extending through a slot 57 of that section member 17. Also for holding the base 55, adjustable bolt means 59 may be threaded through bars 60 of the forward section 17 and capable of engaging the rear side of the base 55.

Some changes may be made in the construction and arrangement of my method of and means for unloading stored material without departing from the real spirit and purpose of my invention, and it is my intention to cover by my claims, any modified forms of structure or use of mechanical equivalents which may be reasonably included within their scope.

I claim:

1. In an apparatus for removing material from a building structure, an elongated member consisting of a plurality of pivoted together sections, means for resiliently biasing said sections in a predetermined position relative to one another, a track means on each side and forward end of said elongated member, a rotatably mounted sprocket wheel at the rear end of said elongated member, a prime mover operatively connected to said sprocket wheel, an endless chain engaging the two side and forward end track means of said elongated member, and also engaging said sprocket wheel, and material engaging members secured to said endless chain.

2. In an apparatus for removing material from a building structure, an elongated member consisting of a plurality of pivoted together sections, means for resiliently biasing said sections in a predetermined position relative to one another, said sections being pivotally movable away from said predetermined position against the resilient bias by exerting a force on at least one of said sections, means limiting the pivotal movement of each of the sections of said elongated member relative to the section adjacent to it, a track means on each side and forward end of said elongated member, a rotatably mounted sprocket wheel at the rear end of said elongated member, a prime mover operatively connected to said sprocket wheel, an endless chain engaging the two side and forward end track means of said elongated member, and also engaging said sprocket wheel, and material engaging members secured to said endless chain.

3. In an apparatus for removing material from a building structure, an elongated member consisting of a plurality of pivoted together sections, means for resiliently biasing the sections of said elongated member in a substantially straight line, said sections being movable out of said straight line by exerting a force on at least one of said sections and movable back to said straight line by said means for resiliently biasing when said force is removed, a track means on each side and forward end of said elongated member, a rotatably mounted sprocket wheel at the rear end of said elongated member, a prime mover operatively connected to said sprocket wheel, an endless chain engaging the two side and forward end track means of said elongated member, and also engaging said sprocket wheel, and material engaging members secured to said endless chain.

4. In an apparatus for removing material from a building structure, an elongated member consisting of a plurality of pivoted together sections, means for resiliently biasing said sections in a predetermined position relative to one another, sad sections being pivotally movable away from said predetermined position by exerting a force on at least one of said sections and movable back, to said predetermined position by said means for resiliently biasing when said force is removed, a track means on each side and forward end of said elongated member, a rotatably mounted sprocket wheel at the rear end of said elongated member, a prime mover operatively connected to said sprocket wheel, an endless chain engaging the two side and forward end track means of said elongated member, and also engaging said sprocket wheel, a wall bumper member on the forward end of said elongated member for limiting the movement of the forward end of the elongated member in a direction toward the inside wall of a building structure in which the apparatus is adapted to operate, and material engaging members secured to said endless chain.

5. In an apparatus for removing material from a building structure, an elongated member consisting of a plurality of pivoted together sections, means for resiliently biasing said sections in a predetermined position relative to one another, said sections being pivotally movable away from said predetermined position by exerting a force on at least one of said sections and movable back to said predetermined position by said means for resiliently biasing when said force is removed, a track means on each side and forward end of said elongated member, a rotatably mounted sprocket wheel at the rear end of said elongated member, a prime mover operatively connected to said sprocket wheel, and endless chain engaging the two side and forward end track means of said elongated member, and also engaging said sprocket wheel, a wall bumper member on the longitudinal central area of the said elongated member for limiting the movement of the central area of said elongated member in a direction toward the inside of the wall of a building structure in which the apparatus is adapted to operate, and material engaging members secured to said endless chain.

6. In an apparatus for removing material from a building structure, an elongated member consisting of a plurality of pivoted together sections, means for resiliently biasing said sections in a predetermined position relative to one another, said sections being pivotally movable away from said predetermined position by exerting a force on at least one of said sections and movable back to said predetermined position by said means for resiliently biasing when said force is removed, a track means on each side and forward end of said elongated member, a rotatably mounted sprocket wheel at the rear end of said elongated member, a prime mover operatively connected to said sprocket wheel, an endless chain engaging the two side and forward end track means of said elongated member, and also engaging said sprocket wheel, and material engaging members secured to said endless chain and extending radially outwardly from said chain at various angles to the horizontal.

7. In an apparatus for removing material from a building structure, an elongated member consisting of a plurality of horizontally pivoted together sections, spring means for resiliently biasing said sections in a predetermined position relative to one another, said sections being pivotally movable away from said predetermined position against the bias of said spring means by exerting a force on at least one of said sections and movable back to said predetermined position by the action of said spring means when said force is removed, a track means on each side and forward end of said elongated member, a rotatably mounted sprocket wheel at the rear end of said elongated member, a prime mover operatively connected to said sprocket wheel, an endless chain engaging the two side and forward end track means of said elongated member, and also engaging said sprocket wheel, material engaging members secured to said endless chain, and means for reversing the rotation of said endless chain.

References Cited in the file of this patent
UNITED STATES PATENTS

| | | |
|---|---|---|
| 946,282 | Snyder et al. | Jan. 11, 1910 |
| 2,955,719 | Hilderbrand | Oct. 11, 1960 |